（12）United States Patent
Bray

(10) Patent No.: US 8,812,860 B1
(45) Date of Patent: Aug. 19, 2014

(54) SYSTEMS AND METHODS FOR PROTECTING DATA STORED ON REMOVABLE STORAGE DEVICES BY REQUIRING EXTERNAL USER AUTHENTICATION

(75) Inventor: Ryan Bray, Calgary (CA)

(73) Assignee: Symantec Corporation, Mountain View, CA (US)

(*) Notice: Subject to any disclaimer, the term of this patent is extended or adjusted under 35 U.S.C. 154(b) by 499 days.

(21) Appl. No.: 12/959,578

(22) Filed: Dec. 3, 2010

(51) Int. Cl.
*H04L 29/06* (2006.01)
*G06F 21/62* (2013.01)

(52) U.S. Cl.
CPC .................................... *G06F 21/62* (2013.01)
USPC ........................................................ 713/182

(58) Field of Classification Search
CPC ......................................................... G06F 21/62
USPC ........................................................ 713/182
See application file for complete search history.

(56) References Cited

U.S. PATENT DOCUMENTS

| | | | | |
|---|---|---|---|---|
| 5,887,065 | A * | 3/1999 | Audebert | 713/172 |
| 7,110,372 | B2 * | 9/2006 | Kovacs et al. | 370/328 |
| 7,197,143 | B2 * | 3/2007 | Duerr et al. | 380/229 |
| 7,260,380 | B2 * | 8/2007 | Dietl et al. | 455/410 |
| 7,526,295 | B2 * | 4/2009 | Khare et al. | 455/458 |
| 7,684,317 | B2 * | 3/2010 | March et al. | 370/229 |
| 7,743,409 | B2 * | 6/2010 | Gonzalez et al. | 726/9 |
| 7,748,031 | B2 * | 6/2010 | Gonzalez et al. | 726/9 |
| 7,945,792 | B2 * | 5/2011 | Cherpantier | 713/194 |
| 7,979,658 | B2 * | 7/2011 | Obereiner et al. | 711/164 |
| 8,412,954 | B2 * | 4/2013 | Chen | 713/189 |
| 8,533,494 | B2 * | 9/2013 | Harada | 713/193 |
| 2002/0060994 | A1 * | 5/2002 | Kovacs et al. | 370/328 |
| 2002/0166053 | A1 * | 11/2002 | Wilson | 713/189 |
| 2003/0014636 | A1 * | 1/2003 | Ahlbrand | 713/176 |
| 2006/0074807 | A1 * | 4/2006 | Gauba et al. | 705/51 |
| 2006/0075441 | A1 * | 4/2006 | Gauba et al. | 725/89 |
| 2006/0080415 | A1 * | 4/2006 | Tu | 709/220 |
| 2006/0179003 | A1 * | 8/2006 | Steele et al. | 705/59 |
| 2006/0200425 | A1 * | 9/2006 | Steele et al. | 705/64 |
| 2007/0011724 | A1 * | 1/2007 | Gonzalez et al. | 726/4 |
| 2007/0016941 | A1 * | 1/2007 | Gonzalez et al. | 726/9 |
| 2007/0060394 | A1 * | 3/2007 | Gowin et al. | 463/47 |
| 2007/0130463 | A1 * | 6/2007 | Law et al. | 713/168 |
| 2007/0220279 | A1 * | 9/2007 | Northcutt et al. | 713/193 |
| 2008/0040358 | A1 * | 2/2008 | Deng | 707/100 |
| 2008/0178009 | A1 * | 7/2008 | Funahashi | 713/186 |

(Continued)

OTHER PUBLICATIONS

Ironkey; Hardware Encryption; https://www.ironkey.com/hardware-encryption; Taken from site on Nov. 3, 2010.

(Continued)

*Primary Examiner* — David Garciá Cervetti
(74) *Attorney, Agent, or Firm* — ALG Intellectual Property, LLC

(57) ABSTRACT

A computer-implemented method for protecting data stored on removable storage devices may include (1) identifying an attempt by a computing device to access encrypted data stored on a removable storage device and then, prior to allowing access to the encrypted data, (2) authenticating a user of the computing device by (a) obtaining security credentials from the user that include a time-synchronized authentication code generated by an external authentication device and (b) verifying the validity of the security credentials. Upon authenticating the user, the method may include allowing access to the encrypted data stored on the removable storage device. Various additional methods, systems, and computer-readable media are also disclosed.

20 Claims, 9 Drawing Sheets

(56) References Cited

U.S. PATENT DOCUMENTS

2009/0249014 A1* 10/2009 Obereiner et al. ............ 711/164
2009/0260081 A1* 10/2009 Johnson et al. ................. 726/22
2010/0031056 A1*  2/2010 Harada ......................... 713/193
2010/0162377 A1*  6/2010 Gonzalez et al. ................. 726/9
2011/0141276 A1*  6/2011 Borghei ........................ 348/143
2011/0276478 A1* 11/2011 Hirson et al. ................... 705/40
2011/0289325 A1* 11/2011 Chen ............................ 713/189

OTHER PUBLICATIONS

Truecrypt; Free Open-Source Disk Encryption Software for Window7/Vista/XP, Mac OSX, and Linux; http://www.truecrypt.org; Taken from site on Nov. 3, 2010.

* cited by examiner

SYSTEMS AND METHODS FOR PROTECTING DATA STORED ON REMOVABLE STORAGE DEVICES BY REQUIRING EXTERNAL USER AUTHENTICATION

BACKGROUND

End users often store data on removable storage devices (such as USB flash drives) due to their portability and ease of use. Unfortunately, removable storage devices containing sensitive data are often stolen or misplaced, potentially resulting in such sensitive data being lost and/or compromised. In addition, while some removable storage devices employ encryption schemes that encrypt data stored within these devices, the encryption schemes employed by such devices may eventually be broken, again potentially compromising any sensitive data stored within such devices.

In view of the above, many companies and agencies (including security firms and government agencies) prohibit the use of removable storage devices in the workplace. Such a prohibition, however, may result in a loss of productivity and convenience on the part of employees. As such, the instant disclosure identifies a need for systems and methods for reliably protecting and managing access to data stored on removable storage devices.

SUMMARY

As will be described in greater detail below, the instant disclosure generally relates to systems and methods for protecting data stored on removable storage devices by requiring users of such devices to obtain authentication codes from external authentication devices prior to gaining access to the same. In one example, a removable storage device (such as a USB flash drive) configured in accordance with the systems and methods described herein may accomplish such a task by (1) identifying an attempt by a computing device to access encrypted data stored on the removable storage device and then (2) authenticating a user of the computing device prior to allowing access to the encrypted data by (a) obtaining a time-synchronized authentication code from the user that was generated by an external authentication device and (b) verifying the validity of the authentication code. Upon successfully authenticating the user, the removable storage device may allow access to the encrypted data stored on the removable storage device.

In some examples, the time-synchronized authentication code may represent a time-synchronized one-time password (i.e., a password that is valid for only one login session or transaction) generated by an external authentication device using (1) a timestamp obtained from a real-time clock that has been synchronized with an additional real-time clock located within the removable storage device and (2) a seed value that is identical to a seed value securely stored within the removable storage device. Users may obtain such authentication codes from authentication devices in a variety of ways; including, for example, via email, phone, text message, and/or a client-server Internet session (conducted, e.g., using a web-based portal via an Internet browser). Examples of suitable external authentication devices include, without limitation, authentication servers, hardware security tokens, (such as smart cards, USB tokens, key fobs, or the like), and software security tokens (such as modules loaded onto, and executed by, computing devices, including mobile phones and PDAs).

In some examples, the authentication process may represent a multi-factor authentication process. In this example, in addition to requiring a time-synchronized authentication code from the user, the removable storage device may require various additional security credentials from the user in order to authenticate the user. Examples of such security credentials include, without limitation, usernames, passwords, personal identification numbers (PINs), biometric data (e.g., fingerprints, retinal scans, etc.), or the like.

If the user fails the authentication process, the removable storage device may deny access to the encrypted data stored on the removable storage device. For example, the removable storage device may deny access to the encrypted data stored on the removable storage device if the user provides an authentication code that does not match an expected authentication code calculated by the removable storage device, if the user exceeds a predetermined number of failed user-authentication attempts, and/or if the user provides an authentication code that represents an instruction from the external authentication device to deny access to the data on the removable storage device (by, e.g., erasing or locking the device). In some examples, the removable storage device may also include a timeout mechanism that requires a user to re-authenticate himself/herself at periodic intervals in order maintain continued access to the data stored on the removable storage device.

In some examples, the authentication device may enable administrators or owners of removable storage devices to remotely manage and control access to their removable storage devices. For example, if an administrator or owner of a removable storage device reports the same as stolen or lost to an authentication server, then the authentication server may deny all future authentication requests involving the removable storage device in question. Alternatively, if an administrator or owner of a removable storage device reports the same as stolen or lost to an authentication server, then the authentication server may fulfill subsequent authentication requests involving the removable storage device in question by providing authentication codes that represent instructions to deny access to data stored on the removable storage device in question. For example, if the authentication server receives a request for an authentication code for a removable storage device that has been reported as stolen or lost, then the authentication server may provide the requesting user with an authentication code that contains instructions for locking the removable storage device in question, erasing all data from the removable storage device in question, and/or erasing a cryptographic key used to encrypt/decrypt data stored on the removable storage device in question. In this example, when the user inputs the authorization code obtained from the authentication server into the removable storage device in question, the removable storage device in question may immediately deny access to data stored on the same in accordance with the provided authorization code (by, e.g., erasing or locking the device).

As will be explained in greater detail below, by limiting access to data stored on removable storage devices to users that have obtained authentication codes from external authentication devices, the systems and methods described herein may enable administrators and owners of removable storage devices to reliably remotely manage and control access to such devices. Accordingly, the systems and methods described herein may help prevent intentional and/or inadvertent data loss, potentially enabling administrators and owners of such devices to deploy the same in sensitive environments with a higher degree of confidence.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
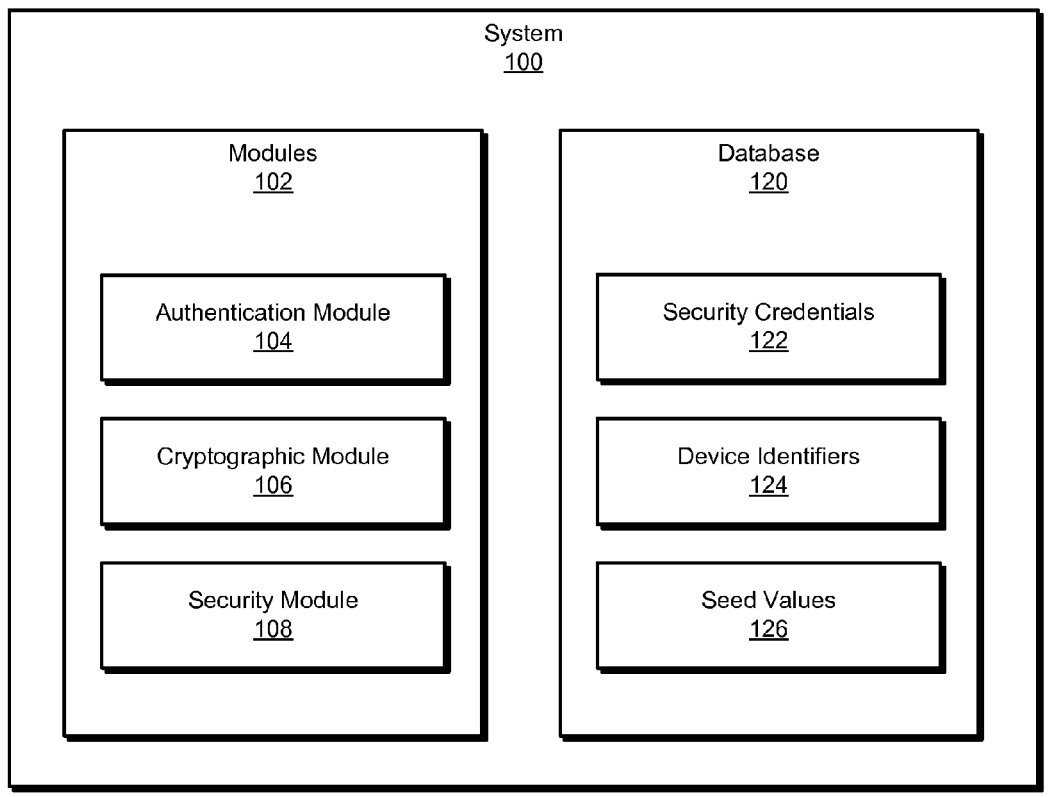
FIG. 1 is a block diagram of an exemplary system for protecting data stored on removable storage devices by requiring external user authentication.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The following will provide, with reference to FIGS. 1-4, detailed descriptions of exemplary systems for protecting data stored on removable storage devices by requiring external user authentication. Detailed descriptions of corresponding computer-implemented methods will also be provided in connection with FIGS. 5-7. In addition, detailed descriptions of an exemplary computing system and network architecture capable of implementing one or more of the embodiments described herein will be provided in connection with FIGS. 8 and 9, respectively.

FIG. 1 is a block diagram of an exemplary system 100 for protecting data stored on removable storage devices by requiring external user authentication. As illustrated in this figure, exemplary system 100 may include one or more modules 102 for performing one or more tasks. For example, and as will be explained in greater detail below, exemplary system 100 may include an authentication module 104 programmed to authenticate users of removable storage devices. Exemplary system 100 may also include a cryptographic module 106 programmed to perform various cryptographic functions on data stored on such devices.

In addition, and as will be described in greater detail below, exemplary system 100 may include a security module 108 programmed to deny access to removable storage devices that have been reported as lost or stolen. Although illustrated as separate elements, one or more of modules 102 in FIG. 1 may represent portions of a single module or application.

In certain embodiments, one or more of modules 102 in FIG. 1 may represent one or more software applications or programs that, when executed by a processor of a device, may cause the device to perform one or more tasks. For example, and as will be described in greater detail below, one or more of modules 102 may represent software modules stored and configured to run on one or more devices, such as the devices illustrated in FIG. 2 (e.g., removable storage device 202, computing device 212, and/or authentication server 206), the devices illustrated in FIG. 3 (e.g., removable storage device 202, computing device 212, and/or hardware security token 332), the devices illustrated in FIG. 4 (e.g., removable storage device 202, computing device 212, and/or external computing device 430), computing system 810 in FIG. 8, and/or portions of exemplary network architecture 900 in FIG. 9. One or more of modules 102 in FIG. 1 may also represent all or portions of a firmware environment and/or one or more special-purpose computers configured to perform one or more tasks.

As illustrated in FIG. 1, exemplary system 100 may also include one or more databases, such as database 120. In one example, database 120 may store security credentials 122 for users of removable storage devices, device identifiers 124 that uniquely identify such devices, and/or seed values 126 associated with such devices. Database 120 may represent portions of a single database or computing device or a plurality of databases or computing devices. For example, database 120 may represent a portion of authentication server 232 in FIG. 2, computing system 810 in FIG. 8, and/or portions of exemplary network architecture 900 in FIG. 9. Alternatively, database 120 in FIG. 1 may represent one or more physically separate devices capable of being accessed by a computing device, such as authentication server 232 in FIG. 2, computing system 810 in FIG. 8, and/or portions of exemplary network architecture 900 in FIG. 9.

Exemplary system 100 in FIG. 1 may be deployed in a variety of ways. For example, all or a portion of exemplary system 100 may represent portions of exemplary system 200 in FIG. 2, exemplary system 300 in FIG. 3, and/or exemplary system 400 in FIG. 4. As shown in these figures, systems 200, 300 and, 400 may include both an authentication device (e.g., authentication server 232 in FIG. 2, hardware security token 332 in FIG. 3, external computing device 430 containing software security token 432 in FIG. 4) and a removable storage device 202 in communication with a computing device 212.

In one example, and as will be described in greater detail below, modules 102 may, when executed by a processor (e.g., microprocessor 204) of removable storage device 202, require user authentication with an external authentication device prior to granting access to data stored within removable storage device 202. For example, prior to allowing access to encrypted data 207 within memory 206 of removable storage device 202, modules 102 may cause removable storage device 202 to authenticate a user of computing device 212 by (1) requiring and obtaining a time-synchronized authentication code from the user that was generated by an external authentication device (such as authentication server 232 in FIG. 2, hardware security token 332 in FIG. 3, and/or external computing device 430 containing software security token 432 in FIG. 4) and then (2) verifying the validity of the authentication code provided by the user. Upon authenticating the user, modules 102 may cause removable storage device 202 to allow access to encrypted data 207.

Removable storage device 202 generally represents any type or form of removable or portable storage device or medium capable of storing data and/or other computer-readable instructions. Examples of removable storage device 202 include, without limitation, removable flash memory devices (such as USB flash drives), removable magnetic memory devices (such as USB or IEEE 1394 hard disk drives and removable magnetic tape drives), removable optical memory devices (such as portable optical-disc, 3D-optical, and holographic data storage devices), or the like.

In some examples, removable storage device 202 may include both memory 206 and a microprocessor 204 capable of executing one or more of modules 102.

As will be described in greater detail below, microprocessor 204 may enable removable storage device 202 to authenticate users by comparing time-synchronized authentication codes provided by such users with expected authentication codes calculated using timestamps obtained from an internal real-time clock 210 and a seed value 208 securely stored within memory 206. As will be explained in greater detail below, real-time clock 210 may represent a computer clock that keeps track of the current time and that has been synchronized with an additional real-time clock contained within the external authentication device (e.g., real-time clock 234 within authentication server 232 in FIG. 2, real-time clock 340 within hardware security token 332 in FIG. 3, and real-time clock 440 within external computing device 430 containing software security token 432 in FIG. 4). As detailed below, seed value 208 may represent a number or vector that has been assigned to removable storage device 202 for use in initializing a pseudorandom-number-generation sequence.

Figure 2:
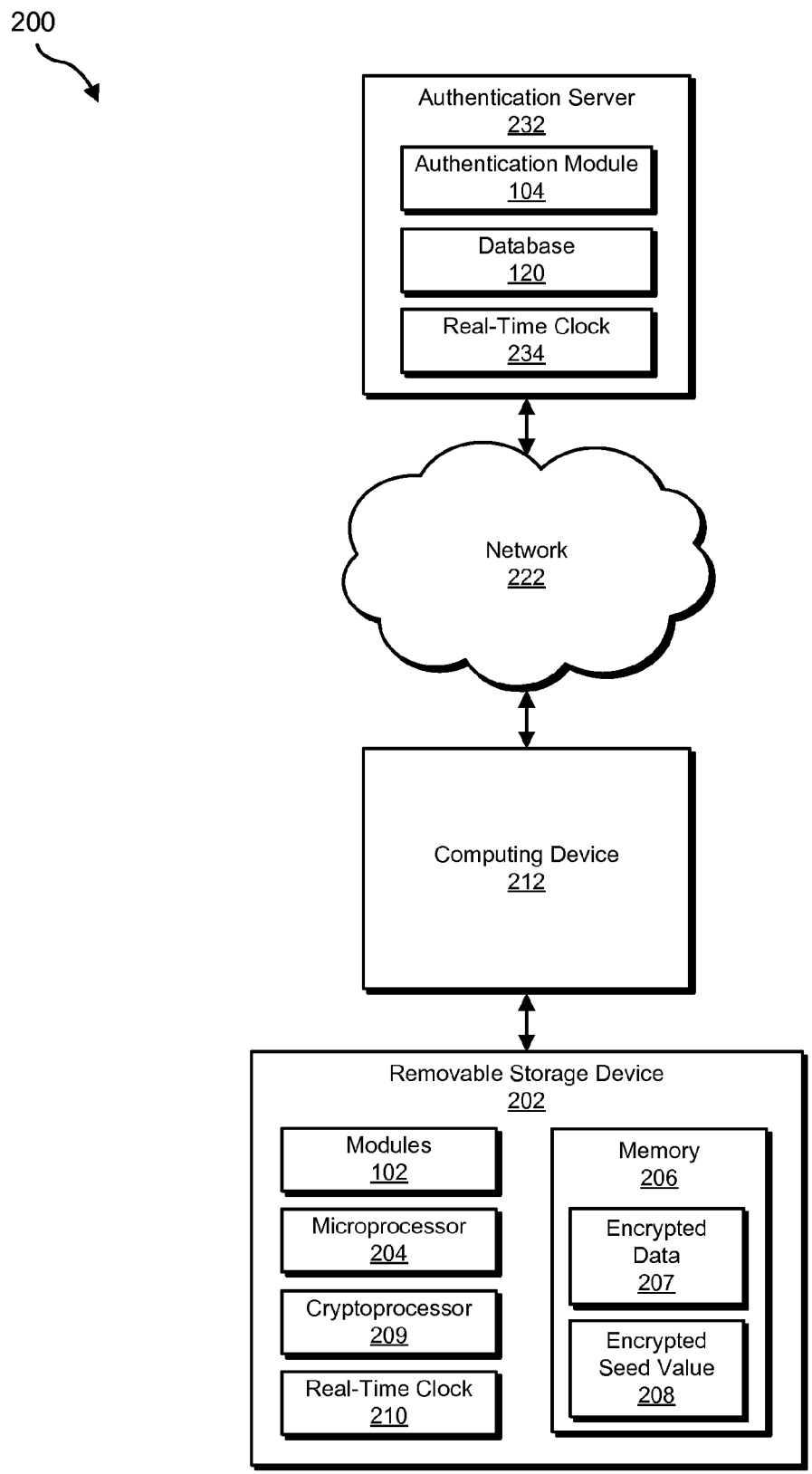
FIG. 2 is a block diagram of an exemplary system for protecting data stored on removable storage devices by requiring external user authentication.
Figure 3:
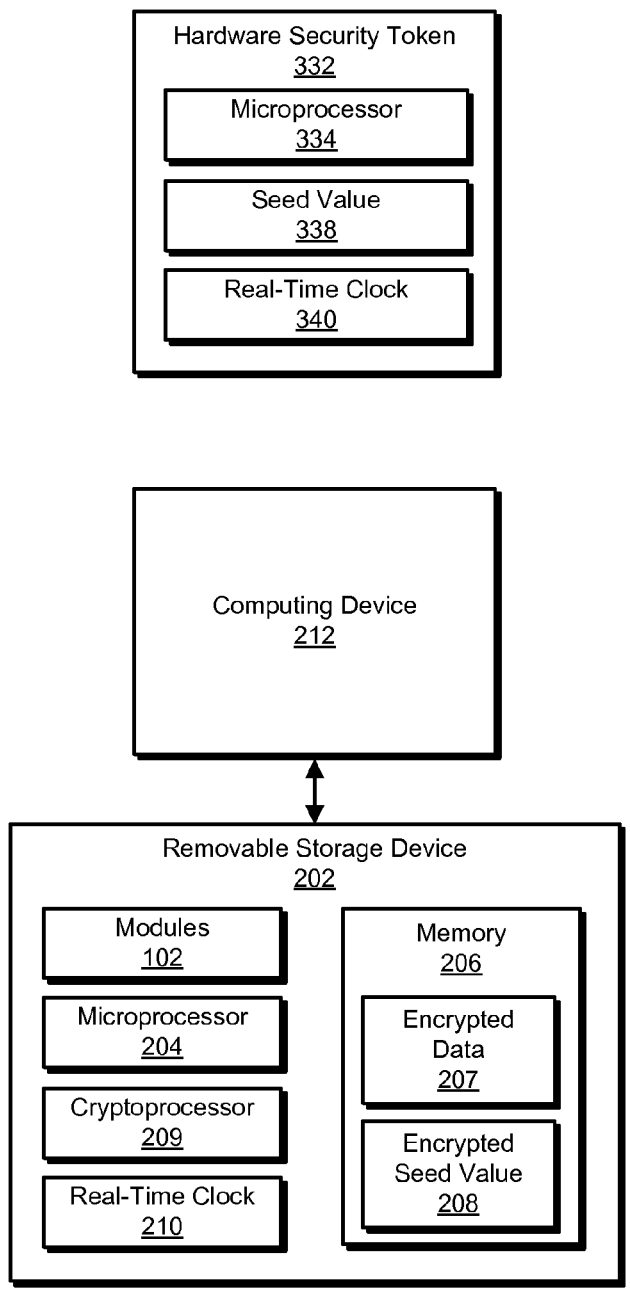
FIG. 3 is a block diagram of an additional exemplary system for protecting data stored on removable storage devices by requiring external user authentication.
Figure 4:
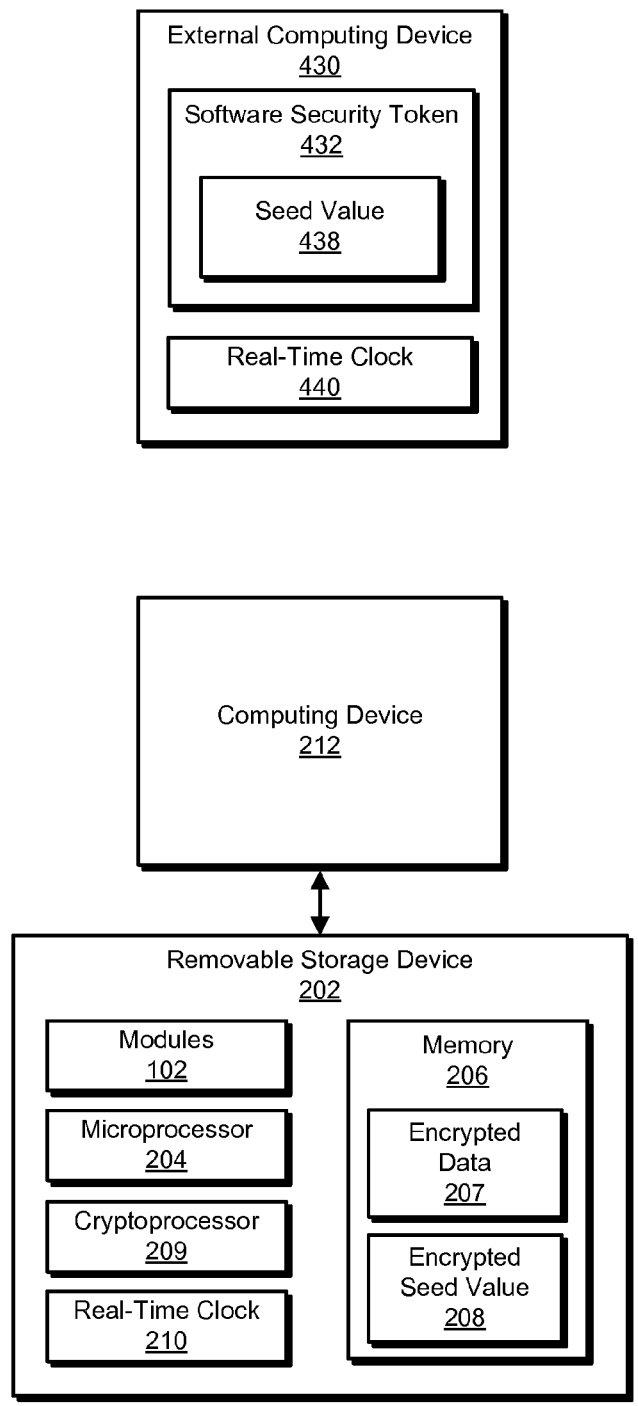
FIG. 4 is a block diagram of an additional exemplary system for protecting data stored on removable storage devices by requiring external user authentication.

As illustrated in FIGS. 2-4, in some embodiments removable storage device may also include a secure cryptoprocessor 209. As will be explained in greater detail below, secure cryptoprocessor 209 may represent a dedicated microprocessor capable of performing various cryptographic operations on data stored within memory 206 of removable storage device 202. In some examples, secure cryptoprocessor 209 may be embedded within a package containing multiple physical security measures, potentially providing a degree of tamper resistance.

Computing device 212 generally represents any type or form of computing device capable of reading computer-executable instructions. Examples of computing device 212 include, without limitation, laptops, desktops, servers, cellular phones, personal digital assistants (PDAs), multimedia players, embedded systems, combinations of one or more of the same, exemplary computing system 810 in FIG. 8, or any other suitable computing device.

Network 222 generally represents any medium or architecture capable of facilitating communication or data transfer. Examples of network 222 include, without limitation, an intranet, a wide area network (WAN), a local area network (LAN), a personal area network (PAN), the Internet, power line communications (PLC), a cellular network (e.g., a GSM Network), exemplary network architecture 900 in FIG. 9, or the like. Network 222 may facilitate communication or data transfer using wireless or wired connections. In one embodiment, network 222 may facilitate communication between computing device 212 and authentication server 232.

Authentication server 232 in FIG. 2, hardware security token 332 in FIG. 3, and external computing device 430 containing software security token 432 in FIG. 4 are examples of the types of authentication devices capable of providing authentication codes to users of removable storage devices. As illustrated in FIGS. 2-4, each of these devices may include a real-time clock (e.g., real-time clock 234 within authentication server 232 in FIG. 2, real-time clock 340 within hardware security token 332 in FIG. 3, and real-time clock 440 within external computing device 430 containing software security token 432 in FIG. 4) that has been synchronized with real-time clock 210 in removable storage device 202. In addition, each authentication device illustrated in these figures may include a seed value (e.g., seed values 126 within database 120 of authentication server 232 in FIG. 2, seed value 338 within hardware security token 332 in FIG. 3, and seed value 438 within external computing device 430 containing software security token 432 in FIG. 4) that is identical to seed value 208 within removable storage device 202. As will be explained in greater detail below, these authentication devices may generate authentication codes for enabling users of removable storage device 202 to access data stored within removable storage device 202 using (1) timestamps obtained from their internal clocks and (2) the seed value that corresponds to seed value 208 within removable storage device 202.

Figure 5:
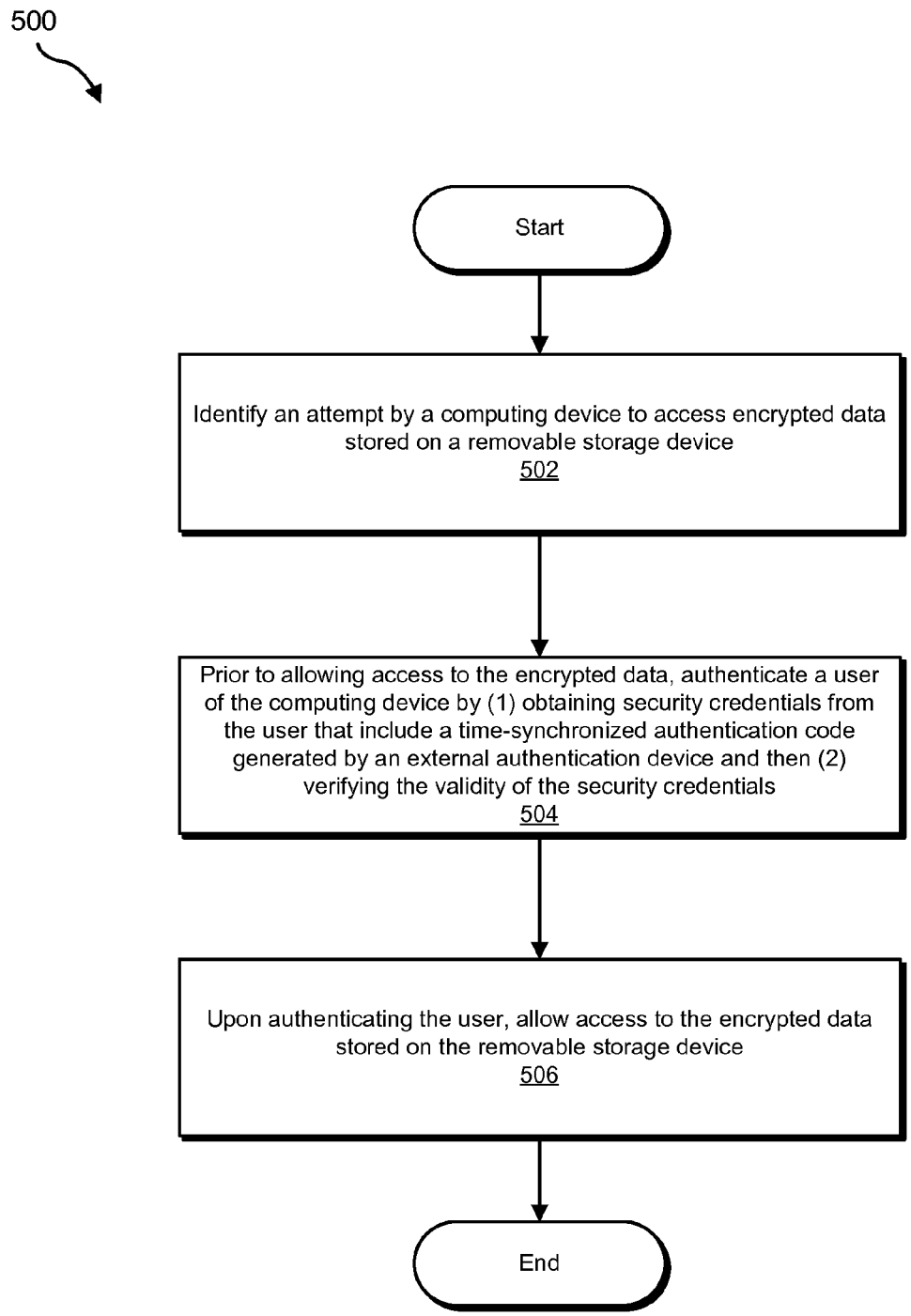
FIG. 5 is a flow diagram of an exemplary method for protecting data stored on removable storage devices by requiring external user authentication.

FIG. 5 is a flow diagram of an exemplary computer-implemented method 500 for protecting data stored on removable storage devices by requiring external user authentication. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, system 300 in FIG. 3, system 400 in FIG. 4, computing system 810 in FIG. 8, and/or portions of exemplary network architecture 900 in FIG. 9.

As illustrated in FIG. 5, at step 502 one or more of the systems described herein may identify an attempt by a computing device to access encrypted data stored on a removable storage device. For example, authentication module 104 may, as part of removable storage device 202 in FIGS. 2-4, identify an attempt by computing device 212 to access encrypted data 207 stored within memory 206 of removable storage device 202.

The systems described herein may perform step 502 in a variety of ways and contexts. In one example, the access attempt identified in step 502 by identification module 104 may represent an attempt to mount removable storage device 202 to an external computing device, such as computing device 212. In other examples, this access attempt may merely represent a post-mounting attempt by an external computing device, such as computing device 212, to access data stored within memory 206 of removable storage device 202.

At step 504, the systems described herein may authenticate a user of the computing device prior to allowing access to the encrypted data stored within the removable storage device. For example, authentication module 104 may, as part of removable storage device 202 in FIGS. 2-4, authenticate a user of computing device 212 prior to allowing computing device 212 to access data stored within memory 206 of removable storage device 202.

The systems described herein may authenticate the user in step 504 in a variety of ways and contexts. In one example, authentication module 104 may authenticate the user by (1) obtaining security credentials from the user and then (2) verifying the validity of the security credentials provided by the user. For example, authentication module 104 may, upon detecting an attempt by computing device 212 to mount or access data stored within removable storage device 202, require that a user of computing device 212 provide security credentials so that authentication module 104 may authenticate the user prior to allowing computing device 212 to access data stored on removable storage device 202.

In one example, the security credentials obtained from the user during the authentication process of step 504 may include a time-synchronized authentication code generated by an external authentication device. The term "time-synchronized authentication code," as used herein, generally refers to a pseudorandom one-time password (i.e., a password that is valid for only one login session or transaction) generated at fixed intervals (as determined by a synchronized real-time clock) using a mathematical algorithm that utilizes both the current time (as dictated by the synchronized real-time clock) and an initial random value (also known as a "seed" value) as variables. In addition, the term "authentication device," as used herein, may refer to any type or form of device capable of providing time-synchronized authentication codes. Examples of such authentication devices include, without limitation, authentication servers (such as authentication server 232 in FIG. 2) and security tokens (such as hardware security token 332 in FIG. 3 and software security token 432 in FIG. 4). Similarly, examples of security tokens include, without limitation, hardware security tokens (such as smart cards, USB tokens, key fobs, or the like) and software security tokens (such as modules loaded onto, and executed by, computing devices such as external computing device 430).

For example, authentication module 104 may, as part of removable storage device 202 in FIG. 2, obtain a time-synchronized one-time password from a user of computing device 212 that the user obtained from an external authentication device (e.g., authentication server 232 in FIG. 2, hardware security token 332 in FIG. 3, and/or external computing device 430 containing software security token 432 in FIG. 4) in accordance with the process outlined below in connection with FIG. 7. In this example, the external authentication device may have generated the time-synchronized one-time password provided to the user of computing device 212 using a mathematical algorithm that utilizes the following as variables: (1) a timestamp obtained from a real-time clock within the external authentication device that has been synchronized with an additional real-time clock located within the removable storage device in question and (2) a seed value that is identical to a seed value securely stored within the removable storage device in question. The term "seed value," as used herein, may refer to a number or vector used to initialize a pseudorandom number generator.

For example, a user of computing device 212 may, upon attempting to access removable storage device 202 in FIG. 2 (and receiving a request from the same for an authentication code), request an authentication code for accessing removable storage device 202 from authentication server 232. As will be explained in greater detail below in connection with FIG. 7, the user may request, and authentication server 232 may provide, this authentication code in a variety of ways, including via email, phone, text message, and/or client-server Internet session (conducted, e.g., using a web-based portal via an Internet browser).

As will be explained in greater detail below in connection with FIG. 7, in some examples the user's request to authentication server 232 may uniquely identify the removable storage device in question (in this example, removable storage device 202) by including a unique identifier (such as a device ID) associated with the removable storage device in question. This unique identifier may enable authentication server 232 to identify and retrieve the seed value assigned to or associated with the removable storage device in question from database 120. As will be explained in greater detail below in connection with FIG. 7, authentication server 232 may then generate the requested authentication code using both this seed value and a timestamp obtained from a real-time clock (in this example, real-time clock 234) that has been synchronized with an additional real-time clock (real-time clock 210) located within removable storage device 202.

In some examples, and as will be described in greater detail below in connection with FIG. 7, authentication server 232 may require one or more security credentials from the user prior to providing the requested authentication code. Examples of such security credentials include, without limitation, usernames, passwords, PINs, biometric data (e.g., fingerprints, retinal scans, etc.), or the like. Upon verifying the validity of the security credentials provided by the user, authentication server 232 may provide the requested authentication code to the user.

Figure 6:
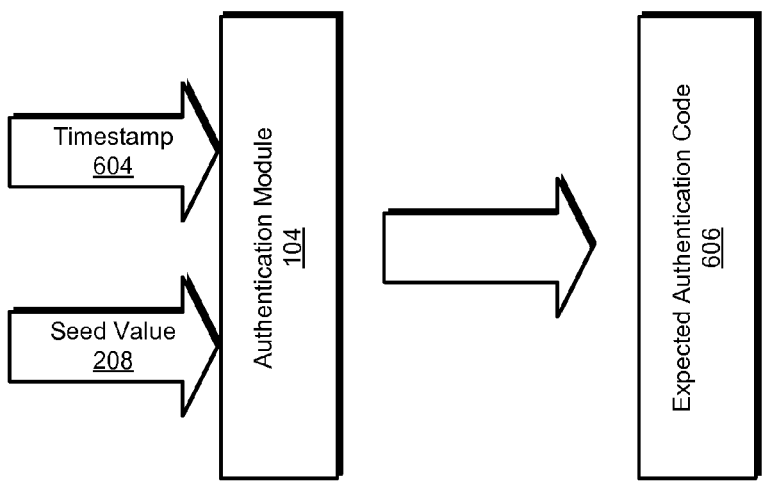
FIG. 6 is a block diagram of an exemplary process for verifying the validity of an authentication code provided by a user.

Upon obtaining the requested authentication code from authentication server 232, the user may provide the same to removable storage device 202 in order to complete the authentication process. Authentication module 104 on removable storage device 202 may then verify the validity of the authentication code provided by the user. For example, and as illustrated in FIG. 6, authentication module 104 may, as part of removable storage device 202 in FIG. 2, verify the validity of the time-synchronized authentication code obtained from the user by (1) obtaining a timestamp 604 from an internal real-time clock (i.e., real-time clock 210) located within removable storage device 202 that has been synchronized with real-time clock 234 of authentication server 232, (2) calculating, using both timestamp 604 and a seed value 208 securely stored within removable storage device 202, an expected authentication code 606, and then (3) determining, by comparing expected authentication code 606 with the time-synchronized authentication code provided by the user, that expected authentication code 606 matches the time-synchronized authentication code provided by the user.

In some examples, the authentication process identified in step 504 may represent a multi-factor authentication process. For example, in addition to requiring a time-synchronized authentication code from the user, authentication module 104 may require various additional security credentials from the user in order to authenticate the user. Examples of such security credentials include, without limitation, usernames, passwords, PINs, biometric data (e.g., fingerprints, retinal scans, etc.), or the like.

If the user fails the authentication process of step 504, the systems described herein may deny access to the encrypted data stored on the removable storage device. The user may fail the authentication process detailed in step 504 in a variety of ways. For example, the user may fail the authentication process by providing an authentication code that does not match the expected authentication code calculated by authentication module 104 of removable storage device 202. Similarly, the user may fail the authentication process by failing a predetermined number of user-authentication attempts. The user may also fail the authentication process by providing an authentication code that represents an instruction from the external authentication device to deny access to the data on the removable storage device. As will be described in greater detail below in connection with FIG. 7, the external authentication device may provide such an instruction at the request of an administrator or owner of the removable storage device upon determining that the removable storage device has been lost or stolen.

If the user fails the authentication process of step 504, the systems described herein may determine that the computing device's attempt to access the data stored on the removable storage device represents a potential security risk and may, as such, deny access to the data stored on the removable storage device. For example, security module 108 may, as part of removable storage device 202 in FIGS. 2-4, deny access to encrypted data 207 stored on removable storage device 202 by erasing encrypted data 207 from removable storage device 202, erasing a cryptographic key used to encrypt/decrypt encrypted data 207 from removable storage device 202, and/or locking removable storage device 202 (by, e.g., preventing all future authentication attempts).

In some examples, removable storage device 202 may include a timeout mechanism that requires a user to re-authenticate himself/herself at periodic intervals. For example, if authentication module 104 determines that more than a predetermined amount of time (e.g., one hour) has passed since the user was successfully authenticated, then authentication module 104 may, as part of removable storage device 202, require that the user re-authenticate himself/herself prior to allowing continued access to the data stored on removable storage device 202.

Returning to FIG. 5, at step 506 the systems described herein may, upon authenticating the user, allow access to the encrypted data stored on the removable storage device in question. For example, one or more of modules 102 may, as part of removable storage device 202 in FIG. 2, allow computing device 212 to access encrypted data 207 stored within memory 206 of removable storage device 202.

The systems described herein may perform step 506 in a variety of ways and contexts. In one example, the systems described herein may allow access to the encrypted data by decrypting the encrypted data using a secure cryptoprocessor located within the removable storage device. For example, upon authenticating the user in step 504, authentication module 104 may instruct cryptographic module 106 to cause cryptoprocessor 209 to decrypt encrypted data 207 for use by computing device 212. The term "secure cryptoprocessor," as used herein, may refer to a dedicated microprocessor for carrying out cryptographic operations. In some examples, this secure cryptoprocessor may be embedded within a package containing multiple physical security measures, potentially providing a degree of tamper resistance.

In other examples, modules 102 of removable storage device 202 may, either alone or in combination with a processor of computing device 212, decrypt encrypted data 207 within removable storage device 202 using various software and/or firmware decryption techniques. Upon allowing access to the encrypted data stored on the removable source device, exemplary method 500 in FIG. 5 may terminate.

As detailed above, the systems and methods described herein may require that users of removable storage devices obtain authentication codes from external authentication devices prior to allowing access to data stored on the removable storage devices. FIG. 7 is a flow diagram of an exemplary server-side, computer-implemented method 700 for providing such authentication codes. The steps shown in FIG. 7 may be performed by any suitable computer-executable code and/or computing system. In some embodiments, the steps shown in FIG. 7 may be performed by one or more of the components of system 100 in FIG. 1, system 200 in FIG. 2, computing system 810 in FIG. 8, and/or portions of exemplary network architecture 900 in FIG. 9.

Figure 7:
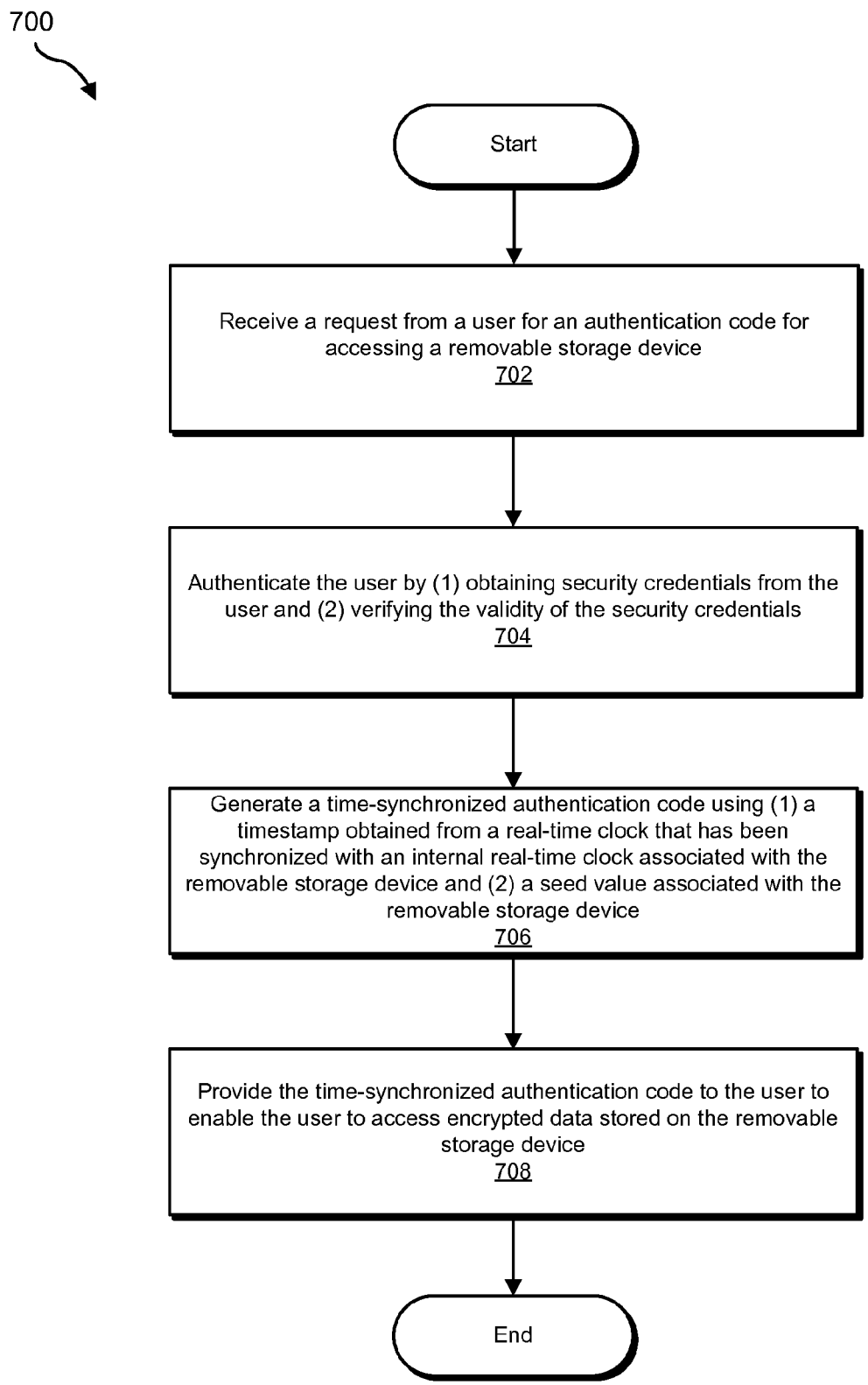
FIG. 7 is a flow diagram of an exemplary server-side method for providing authentication codes to users of removable storage devices.

As illustrated in FIG. 7, at step 702 one or more of the systems described herein may receive a request from a user for an authentication code for accessing data stored on a removable storage device. For example, authentication module 104 may, as part of authentication server 232 in FIG. 2, receive a request from a user for an authentication code for accessing removable storage device 202.

As detailed above, authentication module 104 may, as part of authentication server 232, receive authentication-code requests from users in a variety of ways. For example, authentication module 104 may, as part of authentication server 232, receive authentication-code requests from users via email, phone, text message, the Internet (e.g., via a client-server Internet session conducted using a web-based portal via an Internet browser), or the like.

As detailed above, in some examples the user's authentication-code request may uniquely identify the removable storage device in question by including a unique identifier (such as a device ID) associated with the removable storage device in question. This unique identifier may enable authentication server 232 to identify and retrieve a seed value assigned to or associated with the removable storage device in question from database 120.

At step 704, the systems described herein may authenticate the user by (1) obtaining security credentials from the user and then (2) verifying the validity of the security credentials provided by the user. For example, authentication module 104 may, as part of authentication server 232 in FIG. 2, authenticate the user of step 702 by requiring, and then verifying the validity of, security credentials from the user. Examples of such security credentials include, without limitation, usernames, passwords, PINs, biometric data (e.g., fingerprints, retinal scans, etc.), or the like.

At step 706, the systems described herein may generate a time-synchronized authentication code for the user using (1) a timestamp obtained from a real-time clock that has been synchronized with an additional real-time clock located within the removable storage device in question and (2) a seed value that is identical to a seed value securely stored within the removable storage device in question. For example, authentication server 232 may generate a time-synchronized authentication code for the user using (1) a timestamp obtained from real-time clock 234 and (2) a seed value retrieved from database 120 that is identical to seed value 208 securely stored within removable storage device 202.

At step 708, the systems described herein may provide the time-synchronized identification code generated in step 706 to the user to enable the user to access the removable storage device in question. For example, authentication module 104 may, as part of authentication server 232 in FIG. 2, provide the requested authentication code to the user to enable the user to access encrypted data stored on removable storage device 202. Upon completion of step 708, exemplary method 700 in FIG. 7 may terminate.

In some examples authentication server 232 in FIG. 2 may also enable administrators or owners of removable storage devices to remotely manage and control access to their removable storage devices. For example, authentication server 232 may enable administrators or owners to deny access to removable storage devices that have been lost or stolen. For example, if an administrator or owner of a removable storage device reports the same as stolen or lost to authentication server 232, then authentication server 232 may deny all future authentication requests involving the removable storage device in question.

Alternatively, if an administrator or owner of a removable storage device reports the same as stolen or lost, then authentication server 232 may fulfill subsequent authentication requests involving the removable storage device in question by providing authentication codes that contain instructions to deny access to data stored on the removable storage device in question. For example, if authentication server 232 receives a request for an authentication code for a removable storage device that has been reported as stolen or lost, then authentication server 232 may provide the requesting user with an authentication code that contains instructions for locking the removable storage device in question, erasing all data from the removable storage device in question, and/or erasing a cryptographic key used to encrypt/decrypt data stored on the removable storage device in question. In this example, when the user inputs the authorization code obtained from authentication server 232 into the removable storage device in question, the removable storage device in question may immediately deny access to data stored on the same in accordance with the provided authorization code.

As detailed above, by limiting access to data stored on removable storage devices to users that have obtained authentication codes from external authentication devices, the systems and methods described herein may enable administrators and owners of removable storage devices to reliably remotely manage and control access to such devices. Accordingly, the systems and methods described herein may help prevent intentional and/or inadvertent data loss, potentially enabling administrators and owners of such devices to deploy the same in sensitive environments with a higher degree of confidence.

Figure 8:
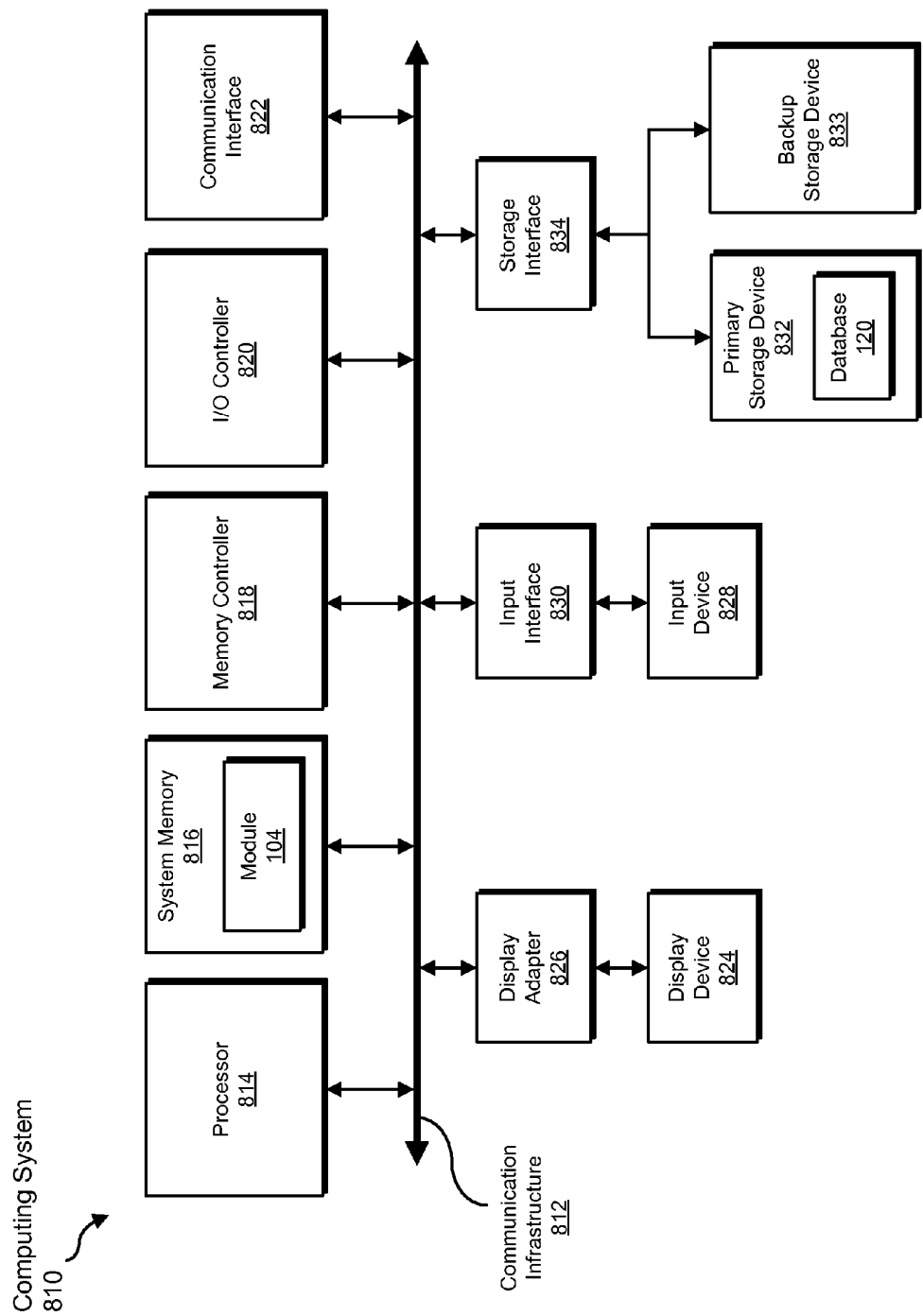
FIG. 8 is a block diagram of an exemplary computing system capable of implementing one or more of the embodiments described and/or illustrated herein.

FIG. 8 is a block diagram of an exemplary computing system 810 capable of implementing one or more of the embodiments described and/or illustrated herein. Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of processing unit capable of processing data or interpreting and executing instructions. In certain embodiments, processor 814 may receive instructions from a software application or module. These instructions may cause processor 814 to perform the functions of one or more of the exemplary embodiments described and/or illustrated herein. For example, processor 814 may perform and/or be a means for performing, either alone or in combination with other elements, one or more of the identifying, providing, authenticating, obtaining, verifying, generating, calculating, determining, decrypting, denying, erasing, locking, re-authenticating, and receiving steps described herein. Processor 814 may also perform and/or be a means for performing any other steps, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In certain embodiments, exemplary computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an ISA, PCI, PCIe, or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the steps or features described and/or illustrated herein, such as identifying, providing, authenticating, obtaining, verifying, generating, calculating, determining, decrypting, denying, erasing, locking, re-authenticating, and receiving.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834. I/O controller 820 may be used, for example, to perform and/or be a means for performing, either alone or in combination with other elements, one or more of the identifying, providing, authenticating, obtaining, verifying, generating, calculating, determining, decrypting, denying, erasing, locking, re-authenticating, and receiving steps described herein. I/O controller 820 may also be used to perform and/or be a means for performing other steps and features set forth in the instant disclosure.

Communication interface 822 broadly represents any type or form of communication device or adapter capable of facilitating communication between exemplary computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution. In certain embodiments, communication interface 822 may perform and/or be a means for performing, either alone or in combination with other elements, one or more of the identifying, providing, authenticating, obtaining, verifying, generating, calculating, determining, decrypting, denying, erasing, locking, re-authenticating, and receiving steps disclosed herein. Communication interface 822 may also be used to perform and/or be a means for performing other steps and features set forth in the instant disclosure.

As illustrated in FIG. 8, computing system 810 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, exemplary computing system 810 may also include at least one input device 828 coupled to communication infrastructure 812 via an input interface 830. Input device 828 generally represents any type or form of input device capable of providing input, either computer or human generated, to exemplary computing system 810. Examples of input device 828 include, without limitation, a keyboard, a pointing device, a speech recognition device, or any other input device. In at least one embodiment, input device 828 may perform and/or be a means for performing, either alone or in combination with other elements, one or more of the identifying, providing, authenticating, obtaining, verifying, generating, calculating, determining, decrypting, denying, erasing, locking, re-authenticating, and receiving steps disclosed herein. Input device 828 may also be used to perform and/or be a means for performing other steps and features set forth in the instant disclosure.

As illustrated in FIG. 8, exemplary computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, database 120 from FIG. 1 may be stored in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

In certain embodiments, storage devices 832 and 833 may be used, for example, to perform and/or be a means for performing, either alone or in combination with other elements, one or more of the identifying, providing, authenticating, obtaining, verifying, generating, calculating, determining, decrypting, denying, erasing, locking, re-authenticating, and receiving steps disclosed herein. Storage devices 832 and 833 may also be used to perform and/or be a means for performing other steps and features set forth in the instant disclosure.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 810 may be configured as an application specific integrated circuit (ASIC) adapted to implement one or more of the exemplary embodiments disclosed herein.

Figure 9:
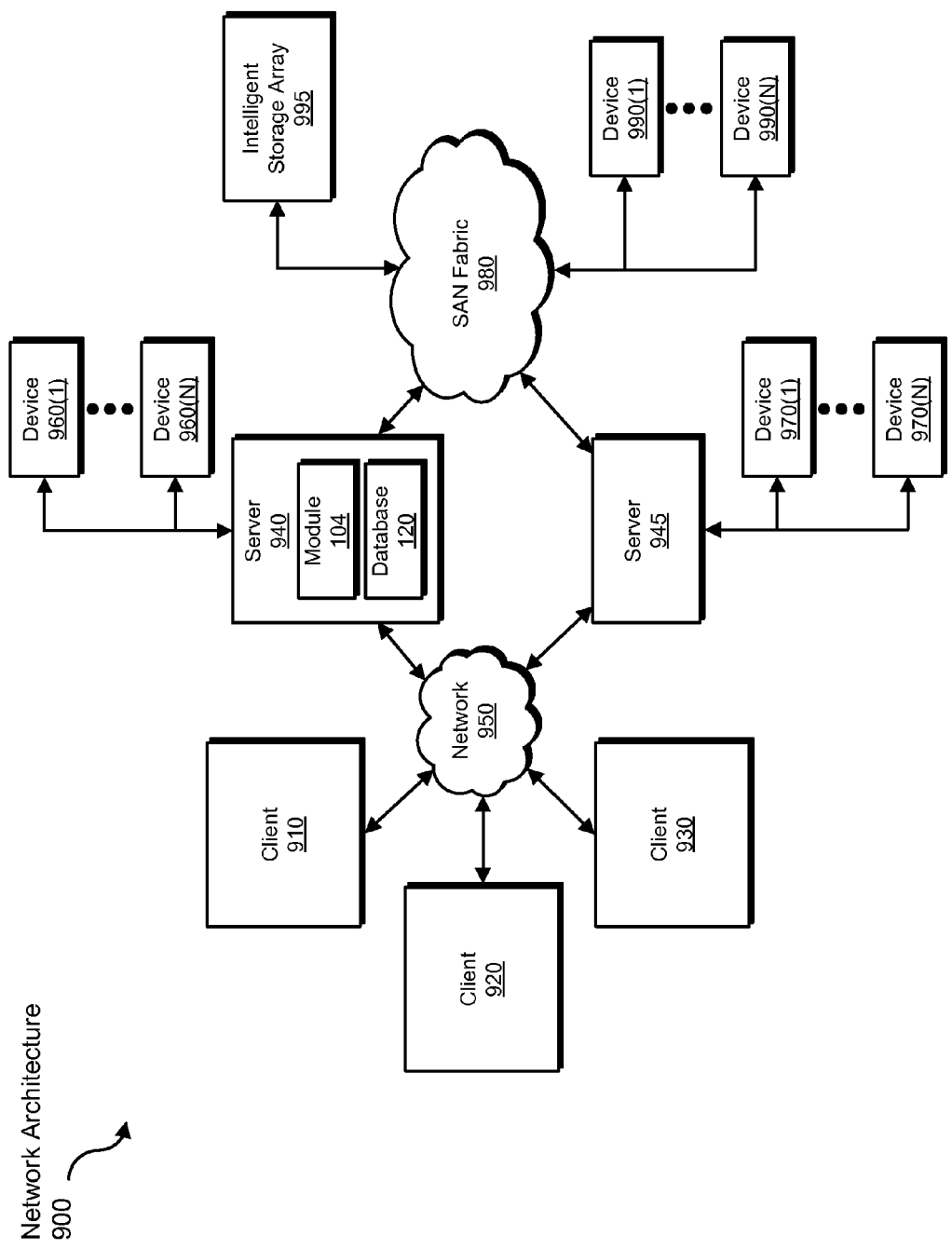
FIG. 9 is a block diagram of an exemplary computing network capable of implementing one or more of the embodiments described and/or illustrated herein.

FIG. 9 is a block diagram of an exemplary network architecture 900 in which client systems 910, 920, and 930 and servers 940 and 945 may be coupled to a network 950. Client systems 910, 920, and 930 generally represent any type or form of computing device or system, such as exemplary computing system 810 in FIG. 8.

Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as NFS, SMB, or CIFS.

Servers 940 and 945 may also be connected to a storage area network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to exemplary computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the exemplary embodiments disclosed herein may also be encoded as a computer program, stored in server 940, run by server 945, and distributed to client systems 910, 920, and 930 over network 950. Accordingly, network architecture 900 may perform and/or be a means for performing, either alone or in combination with other elements, one or more of the identifying, providing, authenticating, obtaining, verifying, generating, calculating, determining, decrypting, denying, erasing, locking, re-authenticating, and receiving steps disclosed herein. Network architecture 900 may also be used to perform and/or be a means for performing other steps and features set forth in the instant disclosure.

As detailed above, computing system 810 and/or one or more components of network architecture 900 may perform and/or be a means for performing, either alone or in combination with other elements, one or more steps of an exemplary method for protecting data stored on removable storage devices by requiring external user authentication. In one example, such a method may include (1) identifying an attempt by a computing device to access encrypted data stored on a removable storage device, (2) authenticating the user prior to allowing access to the encrypted data by (a) obtaining security credentials from a user of the computing device that include a time-synchronized authentication code generated by an external authentication device and (b) verifying the validity of the security credentials, and then (3) allowing access to the encrypted data stored on the removable storage device upon authenticating the user.

In some examples, the time-synchronized authentication code may represent a time-synchronized one-time password generated by the external authentication device using (1) a timestamp obtained from a real-time clock that has been synchronized with an additional real-time clock located within the removable storage device and (2) a seed value associated with the removable storage device. In one example, the security credentials may also include a username, a password, a PIN, and/or biometric data.

In one example, verifying the validity of the security credentials may include (1) obtaining a timestamp from a real-time clock located within the removable storage device that has been synchronized with an additional real-time clock associated with the external authentication device, (2) calculating, using both the timestamp and a seed value securely stored within the removable storage device, an expected authentication code, and then (3) determining, by comparing the expected authentication code with the time-synchronized authentication code provided by the user, that the expected authentication code matches the time-synchronized authentication code provided by the user. In some embodiments, allowing access to the encrypted data stored on the removable storage device may include decrypting the encrypted data using a secure cryptoprocessor located within the removable storage device.

In one example, the method may also include (1) identifying a subsequent attempt to access the encrypted data stored on the removable storage device, (2) determining that the subsequent attempt to access the encrypted data represents a potential security risk, and then (3) denying access to the encrypted data stored on the removable storage device. Determining that the subsequent attempt to access the encrypted data represents a potential security risk may include (1) determining that an authentication code provided during the subsequent attempt indicates that the subsequent attempt represents a potential security risk and/or (2) determining that more than a predetermined number of failed user-authentication attempts have occurred.

Determining that the authentication code provided during the subsequent attempt indicates that the subsequent attempt represents a potential security risk may include (1) determining, by comparing an expected authentication code with the authentication code provided during the subsequent attempt, that the expected authentication code does not match the authentication code provided during the subsequent attempt and/or (2) determining that the authentication code provided during the subsequent attempt represents an instruction from the external authentication device to deny access to the encrypted data on the removable storage device. In some embodiments, denying access to the encrypted data stored on the removable storage device may include erasing the encrypted data from the removable storage device, erasing a cryptographic key used to encrypt/decrypt the encrypted data from the removable storage device, and/or locking the removable storage device.

In one example, the method may also include (1) determining that more than a predetermined amount of time has passed since the user was successfully authenticated and then (2) re-authenticating the user prior to allowing continued access to the encrypted data on the removable storage device. The authentication device may represent an authentication server or a security token. In addition, the removable storage device may represent a flash memory device, a magnetic memory device, and/or an optical memory device.

Computing system 810 and/or one or more components of network architecture 900 may also perform and/or be a means for performing, either alone or in combination with other elements, one or more steps of an exemplary method for providing authentication codes to users of removable storage devices. In one example, such a method may include (1) receiving a request from a user for an authentication code for accessing a removable storage device, (2) authenticating the user by (a) obtaining security credentials from the user and then (b) verifying the validity of the security credentials, (3) generating a time-synchronized authentication code for the user using (a) a timestamp obtained from a real-time clock that has been synchronized with an additional real-time clock located within the removable storage device and (b) a seed value associated with the removable storage device, and then (4) providing the time-synchronized authentication code to the user to enable the user to access encrypted data stored on the removable storage device.

In some examples, the security credentials may include a unique identifier associated with the removable storage device, a username, a password, a PIN, and/or biometric data. In one example, providing the time-synchronized authentication code to the user may include providing the time-synchronized authentication code to the user via email, phone, text message, and/or a client-server Internet session.

The method may also include (1) receiving an instruction from the user to deny subsequent access to the removable storage device and then, upon receiving a subsequent authentication-code request from an additional user, (2) generating an authentication code that represents an instruction to deny access to the encrypted data on the removable storage device and (3) providing the authentication code to the additional user. The instruction to deny access to the encrypted data on the removable storage device may include (1) an instruction to erase the encrypted data from the removable storage device, (2) an instruction to erase a cryptographic key used to encrypt/decrypt the encrypted data from the removable storage device, and/or (3) an instruction to lock the removable storage device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, modules 102 in FIG. 1 may transform removable storage device 202 in FIG. 2 into a device capable of requiring external user authentication prior to granting access to data stored within the same.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for protecting data stored on removable storage devices by requiring external user authentication, at least a portion of the method being performed by a removable storage device comprising at least one processor, the method comprising:

identifying an attempt by a computing device to access encrypted data stored on the removable storage device;
prior to allowing access to the encrypted data, authenticating a user of the computing device by:
obtaining, at the removable storage device, security credentials from the user, wherein the security credentials comprise a time-synchronized password generated by an external authentication device that is valid for only one login session;
verifying, at the removable storage device, the validity of the security credentials;
upon authenticating the user, allowing access to the encrypted data stored on the removable storage device for only one login session.

2. The method of claim 1, wherein the time-synchronized password is generated by the external authentication device using:
a timestamp obtained from a real-time clock that has been synchronized with an additional real-time clock located within the removable storage device;
a seed value associated with the removable storage device.

3. The method of claim 1, wherein the security credentials further comprise at least one of:
a username;
a personal identification number;
biometric data.

4. The method of claim 1, wherein verifying, at the removable storage device, the validity of the security credentials comprises:
obtaining a timestamp from a real-time clock located within the removable storage device that has been synchronized with an additional real-time clock associated with the external authentication device;
calculating, using both the timestamp and a seed value securely stored within the removable storage device, an expected password;
determining, by comparing the expected password with the time-synchronized password provided by the user, that the expected password matches the time-synchronized password provided by the user.

5. The method of claim 1, wherein allowing access to the encrypted data stored on the removable storage device for only one login session comprises decrypting the encrypted data using a secure cryptoprocessor located within the removable storage device.

6. The method of claim 1, further comprising:
identifying a subsequent attempt by the computing device to access the encrypted data stored on the removable storage device;
determining that the subsequent attempt to access the encrypted data represents a potential security risk;
denying access to the encrypted data stored on the removable storage device.

7. The method of claim 6, wherein determining that the subsequent attempt to access the encrypted data represents a potential security risk comprises at least one of:
determining that a password provided during the subsequent attempt indicates that the subsequent attempt represents a potential security risk;
determining that more than a predetermined number of failed user-authentication attempts have occurred.

8. The method of claim 7, wherein determining that the password provided during the subsequent attempt indicates that the subsequent attempt represents a potential security risk comprises at least one of:
determining, by comparing an expected password with the password provided during the subsequent attempt, that the expected password does not match the password provided during the subsequent attempt;
determining that the password provided during the subsequent attempt represents an instruction from the external authentication device to deny access to the encrypted data stored on the removable storage device.

9. The method of claim 6, wherein denying access to the encrypted data stored on the removable storage device comprises at least one of:
erasing the encrypted data from the removable storage device;
erasing a cryptographic key used to encrypt/decrypt the encrypted data from the removable storage device;
locking the removable storage device.

10. The method of claim 1, further comprising:
determining that more than a predetermined amount of time has passed since the user was successfully authenticated;
re-authenticating the user prior to allowing continued access to the encrypted data stored on the removable storage device.

11. The method of claim 1, wherein the external authentication device comprises:
an authentication server;
a security token.

12. The method of claim 1, wherein the removable storage device comprises:
a flash memory device;
a magnetic memory device;
an optical memory device.

13. A computer-implemented method for authenticating users of removable storage devices, at least a portion of the method being performed by a computing device comprising at least one processor, the method comprising:
receiving a request from a user for a password for accessing a removable storage device;
authenticating the user by:
obtaining security credentials from the user;
verifying the validity of the security credentials;
generating a time-synchronized password for the user that is valid for only one login session using:
a timestamp obtained from a real-time clock that has been synchronized with an additional real-time clock located within the removable storage device;
a seed value associated with the removable storage device;
providing the time-synchronized password to the user to enable the user to provide the time-synchronized password to the removable storage device to gain access to the encrypted data for the only one login session.

14. The method of claim 13, wherein the security credentials comprise at least one of:
a unique identifier associated with the removable storage device;
a username;
a personal identification number;
biometric data.

15. The method of claim 13, wherein providing the time-synchronized password to the user comprises providing the time-synchronized password to the user via at least one of:
email;
phone;
a text message;
a client-server Internet session.

16. The method of claim 13, further comprising:
receiving an instruction from the user to deny subsequent access to the removable storage device;

upon receiving a subsequent password request from an additional user, generating a password that represents an instruction to deny access to the encrypted data on the removable storage device;

providing the password to the additional user.

17. The method of claim 16, wherein the instruction to deny access to the encrypted data on the removable storage device comprises at least one of:

an instruction to erase the encrypted data from the removable storage device;

an instruction to erase a cryptographic key used to encrypt/decrypt the encrypted data from the removable storage device;

an instruction to lock the removable storage device.

18. A removable storage device comprising:

memory;

an authentication module programmed to:

identify an attempt by a computing device to access encrypted data stored in the memory of the removable storage device;

prior to allowing access to the encrypted data, authenticate a user of the computing device by:

obtaining, at the removable storage device, security credentials from the user, wherein the security credentials comprise a time-synchronized password generated by an external authentication device that is valid for only one login session;

verifying, at the removable storage device, the validity of the security credentials;

upon authenticating the user, allow access to the encrypted data stored in the memory of the removable storage device for only one login session;

at least one processor configured to execute the authentication module.

19. The removable storage device of claim 18, further comprising:

a real-time clock that has been synchronized with an additional real-time clock associated with the external authentication device;

a seed value securely stored within the memory of the removable storage device;

wherein the authentication module verifies the validity of the security credentials by:

obtaining a timestamp from the real-time clock;

calculating, using both the timestamp and the seed value, an expected password;

determining, by comparing the expected password with the time-synchronized password provided by the user, that the expected password matches the time-synchronized password provided by the user.

20. The removable storage device of claim 18, further comprising:

a cryptographic module programmed to encrypt/decrypt data stored within the memory of the removable storage device;

a secure cryptoprocessor configured to execute the cryptographic module.

* * * * *